US007305756B2

(12) United States Patent
Regan

(10) Patent No.: US 7,305,756 B2
(45) Date of Patent: Dec. 11, 2007

(54) TUBE EXTRACTING DEVICE

(75) Inventor: Daniel E. Regan, Nova Scotia (CA)

(73) Assignee: Barcock & Wilcox Canada Ltd., Cambridge, Ontario (CA)

( * ) Notice: Subject to any disclaimer, the term of this patent is extended or adjusted under 35 U.S.C. 154(b) by 434 days.

(21) Appl. No.: 10/830,123

(22) Filed: Apr. 22, 2004

(65) Prior Publication Data

US 2005/0235486 A1 Oct. 27, 2005

(51) Int. Cl.
*B23P 15/26* (2006.01)
*B23P 6/00* (2006.01)

(52) U.S. Cl. ......................... 29/727; 29/280; 29/426.1; 29/426.5; 29/890.031

(58) Field of Classification Search .................. 29/727, 29/280, 282, 252, 244, 426.1, 426.5, 890.031; 294/104; 254/30, 106
See application file for complete search history.

(56) References Cited

U.S. PATENT DOCUMENTS 1,702,349 A * 2/1929 Krell .......................... 294/113
1,753,677 A 4/1930 Andresen
3,057,631 A 10/1962 LaFleur
3,104,461 A 9/1963 Nieglos
3,245,247 A 4/1966 Valente
3,507,028 A 4/1970 Stellatella
3,613,489 A 10/1971 Randich
3,791,011 A 2/1974 Kays
3,857,158 A 12/1974 Costello
3,974,556 A * 8/1976 Kubik ......................... 29/764
3,979,816 A 9/1976 Green
3,998,428 A * 12/1976 Miles ....................... 254/29 R
4,000,556 A 1/1977 Ciminero
4,053,062 A 10/1977 Travis
4,180,903 A 1/1980 Hannigan, Jr.
4,231,246 A 11/1980 Gorenc et al.
4,233,730 A 11/1980 Godbe
4,280,274 A 7/1981 Filer
4,283,826 A 8/1981 Miller
4,312,124 A 1/1982 Calhoun
4,355,450 A 10/1982 Miller
4,369,569 A 1/1983 Armstrong, Jr. et al.
4,406,856 A 9/1983 Wilkins et al.
4,471,516 A 9/1984 Godbe
4,522,439 A * 6/1985 Haney ..................... 294/110.1
4,586,695 A * 5/1986 Miller ......................... 254/30
4,627,155 A 12/1986 Mancabelli (Continued)

*Primary Examiner*—David P. Bryant
*Assistant Examiner*—Sarang Afzali
(74) *Attorney, Agent, or Firm*—Eric Marich; Michael J. Seymour

(57) ABSTRACT

The invention is related to a tube extracting device for compressing a tube end extended from a conventional drum of a boiler to remove the tube. The device includes a housing comprised of an outer clamping plate and an inner clamping plate pivotally connected by a pin. A grip for receiving the tube extends down from the housing. A hydraulically-powered ram moves the outer clamping plate relative to the inner clamping plate so that the grip closes around and compresses the tube. The power to the hydraulic ram is then shut, springs return the outer clamping plate and the inner clamping plate to their original position, which, in turn, opens the grip so that the removed tube can be released from the device. The device is then lifted by a handle and the tube is removed from the drum.

18 Claims, 2 Drawing Sheets

U.S. PATENT DOCUMENTS 4,643,247 A 2/1987 Tomasula
4,650,235 A * 3/1987 Shaginian et al. ............ 294/88
4,650,236 A * 3/1987 Haney et al. ............ 294/110.1
4,670,975 A 6/1987 Dettinger
4,776,072 A 10/1988 Jacquier
4,877,228 A * 10/1989 Ripert ........................ 269/156
4,959,899 A 10/1990 Martin
5,168,623 A 12/1992 Rabe
5,276,965 A 1/1994 Hahn et al.
5,375,897 A * 12/1994 Gazel-Anthoine ....... 294/86.29
5,609,380 A * 3/1997 White ........................ 294/104
5,621,966 A 4/1997 Kvenvold et al.
5,826,334 A 10/1998 Weeks et al.
5,893,209 A 4/1999 Weeks et al.
5,974,642 A 11/1999 Weeks et al.
6,182,354 B1 2/2001 Weeks
6,205,632 B1 3/2001 Weeks et al.
6,209,181 B1 4/2001 Weeks
6,216,326 B1 4/2001 Ritter et al.
6,430,790 B1 8/2002 Haycook
6,447,036 B1 * 9/2002 White ........................ 294/113

* cited by examiner

TUBE EXTRACTING DEVICE

FIELD AND BACKGROUND OF INVENTION

The present invention relates generally to the field of tube extracting devices, and more particularly to an improved tube extracting device for removing tubes from different types of structures, such as boilers, condensers, evaporators, and the like.

Tubes in high pressure steam boilers are mechanically expanded to seal against the inside diameter of the tube hole. The tubes are flared or "belled" to prevent them from blowing out in the event that the rolled joint fails.

Because of malfunctions or normal preventive maintenance, it may be necessary to remove one or all of the tubes from the boiler. To replace the tubes, they are typically cut axially and then compressed to allow the tube end to be forcibly withdrawn from the tube hole. The compression of the tube ends is typically done manually by a ball peen hammer and a chisel. This method for compressing a tube end is time consuming, laborious, and often results in damage to the drum sheet and injury to the operator.

Various tools have been suggested for removing tubes by using collapsing gripping devices for engaging the tube and pulling the tube out of the tube hole.

U.S. Pat. No. 6,205,632 to Weeks et al. discloses a bulky boiler tube compression tool which uses rotatable jaws to engage and compress the tube into an inwardly-curled cross section to facilitate removal of the tube from the boiler.

U.S. Pat. No. 4,180,903 to Hannigan, Jr. reveals a hydraulic-driven apparatus having a plurality of arms with moving gripping fingers for engaging and crimping the tube.

These prior art devices have complex and bulky structures comprised of a plurality of moving parts subject to easy breakage and expensive repair.

SUMMARY OF INVENTION

It is an object of the present invention to provide a tube extractor that is simple to use and does not cause damage to the drum sheet upon compression of the tube ends.

A further object of the present invention is to provide a tube extractor which has a long service life.

A still further object of the present invention is to provide a tube extractor which is safe in use.

A further object of the invention is to provide a tube extractor which is fast in operation and light weight.

Accordingly, an object of the invention is to provide a tube extraction device having a housing with an outer plate and an inner plate pivotally mounted inside the outer plate. A means moves the outer plate relative to the inner plate. A grip which is movably extended from the housing moves from an open position for receiving the tube to a closed position for compressing the tube upon movement of the outer plate relative to the inner plate.

It will be seen that removal of a tube from its secured connection in the drum is very rapid, thereby materially reducing the costs involved in retubing a structure or replacing a tube. The tool is light and portable enough so that a single workman utilizing the tool can readily and rapidly accomplish the job of removing the tubes from a structure. In the past, such a retubing operation normally required several workmen.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
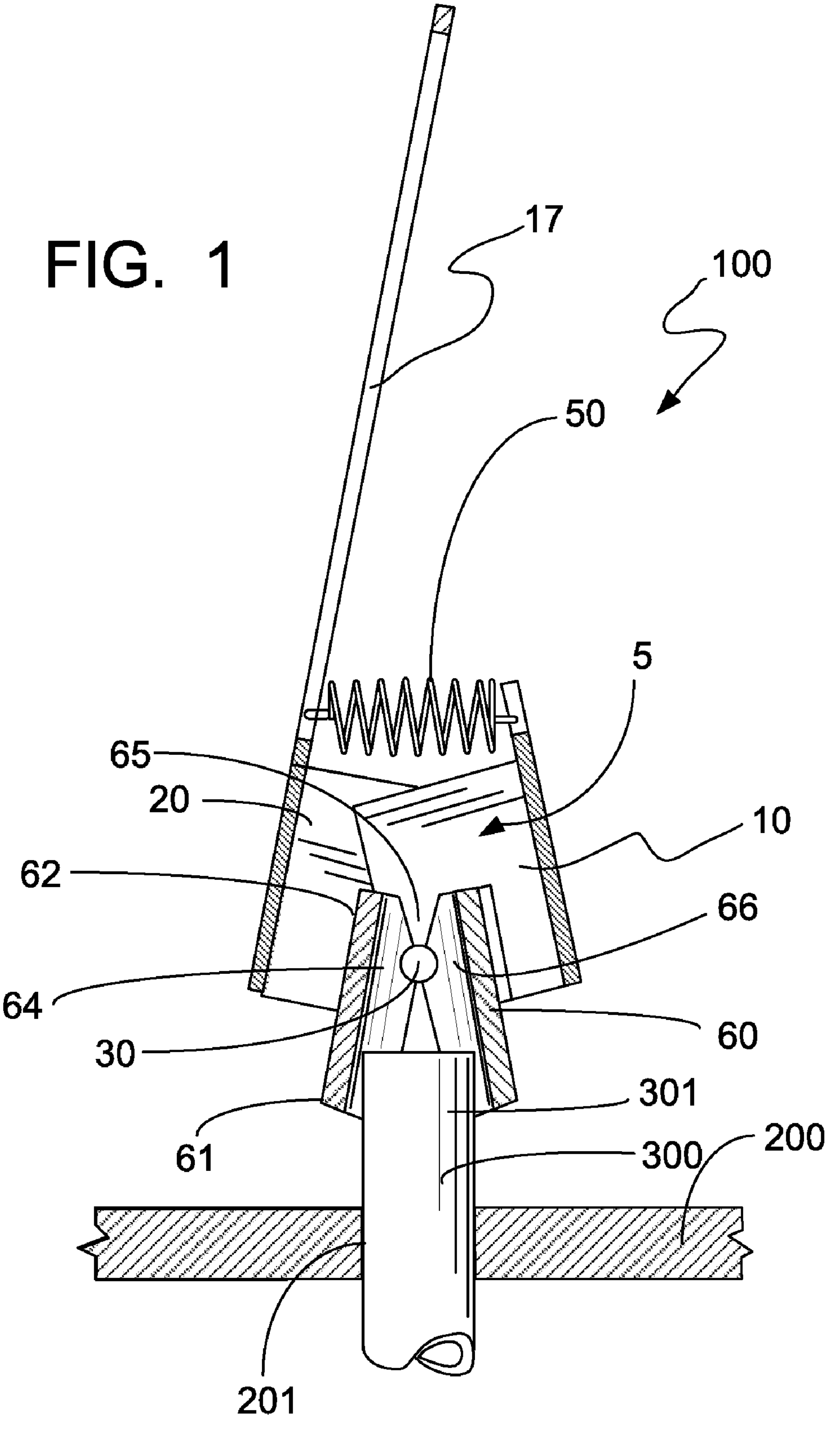
FIG. 1 is a side elevational view of the tube extracting device of the invention.

Referring now to the drawings, in which like reference numerals are used to refer to the same or similar elements, FIG. 1 shows a device 100 in position to compress a tube end 301 of a tube 300 exiting a tube hole 201. The device 100 is positioned above the tube 300 and the surface of a drum 200.

The device 100 includes a housing 5 having an outer clamping plate 10 and an inner clamping plate 20 which are pivotally connected to each other.

The outer clamping plate 10 and the inner clamping plate 20 are preferably u-shaped, but both plates can embody other shapes and configurations, as is well known in the prior art.

Figure 2:
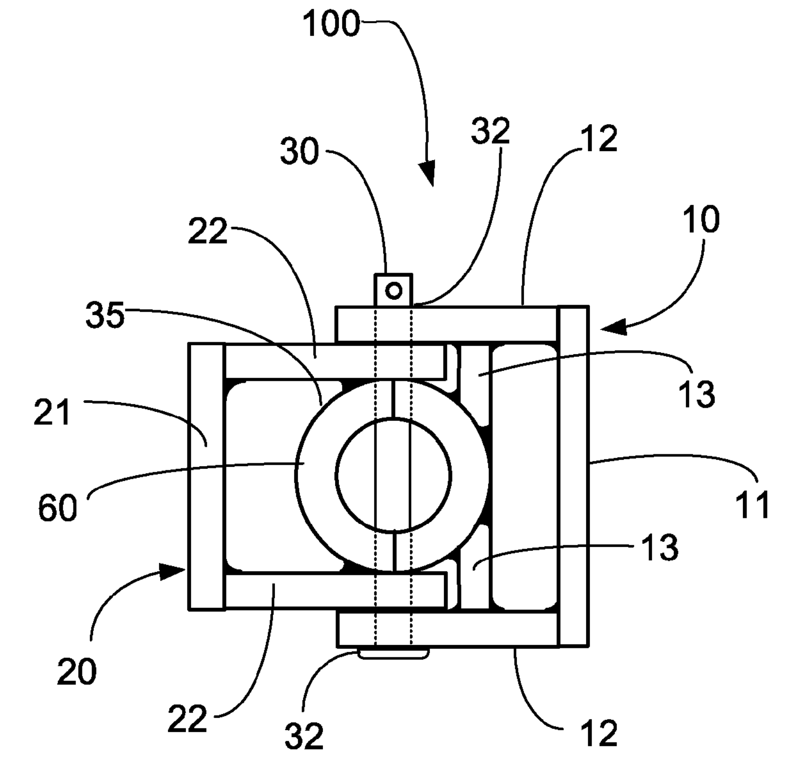
FIG. 2 is a bottom view of the tube extracting device of the invention.

As shown in FIG. 2, the outer clamping plate 10 includes a base 11, two parallel side walls 12 preferably perpendicular to the base 11, and an inner wall 13, preferably two, extended from opposite side walls 12 toward each other. The inner walls 13 preferably extend perpendicular to the side walls 12.

The inner clamping plate 20 includes a base 21 and two parallel side walls 22 preferably perpendicular to the base 21. The side walls 22 of the inner clamping plate 20 extend inside the outer clamping plate 10 to overlap the side walls 12 of the outer clamping plate 10. The base 11 and sides wall 12 of the outer clamping plate 10 preferably have the same width and height as the base 21 and side walls 22 of the inner clamping plate 20. The base 21 of the inner clamping plate preferably has a smaller width than the base 12 of the outer clamping plate.

A conventional pin 30 pivotally connects the outer clamping plate 10 and the inner clamping plate 20. The pin 30 extends through openings 32 in the side walls 12, 22 of the outer clamping plate 10 and the inner clamping plate 20, respectively.

A grip 60 for receiving the tube 300 extends downward from the housing 5. The grip 60 is operationally connected to the housing 5 so that upon movement of the outer clamping plate 10 relative to the inner clamping plate 20, the grip 60 compresses and clamps down on the tube 300.

The grip 60 is preferably a pipe having a bottom end 61 and a top end 62. The grip 60 is preferably divided into two parts 64, 66 which spread apart to create a sufficient opening for receiving the tube 300 and then close to compress the tube 300. The grip 60 is connected, preferably via welds 35, to the side walls 22 of the inner clamping plate 20 and also preferably to the inner walls 13 of the outer clamping plate 10. Upon movement of the outer clamping plate 10 relative to the inner clamping plate 20, the grip closes around the outer periphery of the tube 300 and compresses the tube 300. The top end 62 of the grip has a notch 65 which facilitates the spreading apart of the two parts 64, 66, preferably along the center axis of the pipe, when receiving the tube 300. The pin 30 preferably engages the notch 65 in the grip 60.

The bottom end 61 of the grip 60 is preferably slanted to facilitate gripping the tube 300.

Figure 3:
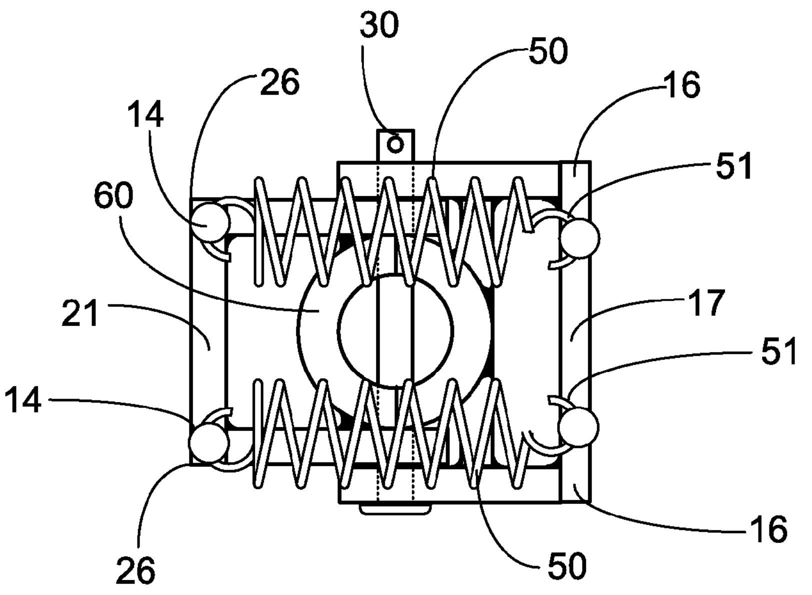
FIG. 3 is a top view of the tube extracting device of the invention.

Posts 14, illustrated in FIG. 3, extend vertically from opposite top edges 16, 26 of the side walls 12, 22 of the outer clamping plate 10 and inner clamping plate 20, respectively.

Springs 50 connect the posts 14 of the outer clamping plate 10 to the opposite posts 14 of inner clamping plate 20. The springs 50 are conventional type coil tension springs with loops 51 at their top and bottom ends. The loops 51 are received in bores formed in the posts 14 for connecting the springs 50 thereto.

A handle 17 extends upward from the posts 14 of the outer clamping plate 10. In order to remove the tube 300, the handle 17 is lifted away from the drum 200 to pull the tube 300.

The outer clamping plate 10 and the inner clamping plate 20 are preferably formed of carbon steel.

The force required for compressing the tube end 301 is generated in a conventional ram (not shown), preferably hydraulically operated, which is connected to the housing 5 by means well-known in the prior art. The ram is preferably coupled to a typical hydraulic pump (not shown) which powers the ram, as is well known in the prior art. The hydraulic pump provides hydraulic fluid to the ram, causing the outer clamping plate 10 to move relative to the inner clamping plate for compressing the tube end 301. Upon the pivoting movement of the outer clamping plate 10 and the inner clamping plate, the grip 60 compresses and clamps the tube 300 away from the inside wall of the tube hole 201. The compressed tube can then be removed from the tube hole 201. The springs 50 automatically return the clamping plates 10, 20 and the grip 60 back to the open position upon shutting off the flow of hydraulic fluid to the ram.

While a specific embodiment of the invention has been shown and described in detail to illustrate the application of the principles of the invention, it will be understood that the invention may be embodied otherwise without departing from such principles.

The invention claimed is:

1. A tube extraction device for compressing a tube, the tube extraction device comprising:

a housing having an outer plate with a first pair of vertical posts and an inner plate with a second pair of vertical posts, the inner plate being pivotally mounted inside the outer plate;

a means for moving the outer plate relative to the inner plate;

a grip movably extended from the housing, the grip moving from an open position for receiving the tube to a close position for compressing the tube upon movement of the outer plate relative to the inner plate;

at least two springs connecting the first pair of vertical posts to the second pair of vertical posts, the springs returning the grip to the open position.

2. The tube extraction device for compressing a tube as claimed in claim 1, wherein the grip comprises a pipe having a bottom end which separates for receiving the tube and a top end connected to the housing, the top end having a notch which allows the bottom end to separate for receiving the tube.

3. A tube extraction device for compressing a tube, the tube extraction device comprising:

a housing having an outer plate and an inner plate pivotally mounted inside the outer plate, wherein the outer plate has a first pair of vertical posts and the inner plate has a second pair of vertical posts and the means for returning the grip to the open position comprises at least two springs connecting the first pair of vertical posts to the second pair of vertical posts;

a means for moving the outer plate relative to the inner plate;

a grip movably extended from the housing, the grip moving from an open position for receiving the tube to a closed position for compressing the tube upon movement of the outer plate relative to the inner plate a means for returning the grip to the open position.

4. A tube extraction device for compressing a tube as claimed in claim 3, wherein the outer plate includes a base, exterior side walls and an interior wall extended from at least one of the exterior walls, the interior wall being connected to the grip.

5. A tube extraction device for compressing a tube as claimed in claim 4, wherein the inner plate includes a base and exterior side walls, the grip being connected to at least one of the exterior side walls of the inner plate.

6. A tube extraction device for compressing a tube as claimed in claim 5, wherein the exterior side walls of the outer plate and the exterior side walls of the inner plate overlap.

7. A tube extraction device for compressing a tube as claimed in claim 5, wherein the exterior side walls of the outer plate and the exterior side walls of the inner plate have approximately the same width.

8. The tube extraction device for compressing a tube as claimed in claim 3, wherein the top end of the pipe has a notch which allows the bottom end to separate for receiving the tube.

9. A tube extraction device for compressing a tube as claimed in claim 8, further comprising a pin for pivotally connecting the outer plate to the inner plate.

10. A tube extraction device for compressing a tube as claimed in claim 9, wherein the pin engages the notch in the top end of the pipe.

11. The tube extraction device for compressing a tube as claimed in claim 3, wherein the grip comprises a pipe having a top end connected to the housing and a bottom end which separates for receiving the tube.

12. The tube extraction device for compressing a tube as claimed in claim 11, wherein the pipe comprises two symmetrical parts which separate along a center axis of the pipe.

13. The tube extraction device for compressing a tube as claimed in claim 11, where the bottom end of the pipe is slanted.

14. A tube extraction device for compressing a tube as claimed in claim 3, wherein the means for moving the outer plate relative to the inner plate comprises a hydraulic powered ram.

15. A tube extraction device for compressing a tube as claimed in claim 3, further comprising a handle extended upward from the outer plate.

16. A tube extraction device for compressing a tube as claimed in claim 3, wherein the outer plate and the inner plate have a u-shape.

17. A tube extraction device for compressing a tube as claimed in claim 3, wherein the outer plate and the inner plate have approximately the same height.

18. A tube extraction device for compressing a tube as claimed in claim 3, wherein the outer plate and the inner plate are formed of carbon steel.

* * * * *